US006667847B2

United States Patent
Sawai (10) Patent No.: US 6,667,847 B2
(45) Date of Patent: Dec. 23, 2003

(54) MAGNETIC TAPE APPARATUS WITH L SHAPED COUPLING SHAFT

(75) Inventor: Kunio Sawai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 129 days.

(21) Appl. No.: 09/945,312

(22) Filed: Aug. 31, 2001

(65) Prior Publication Data

US 2002/0071200 A1 Jun. 13, 2002

(30) Foreign Application Priority Data

Sep. 4, 2000 (JP) .................. U.M. 2000/006417

(51) Int. Cl.[7] ............................................. G11B 15/675
(52) U.S. Cl. ........................................................ 360/96.5
(58) Field of Search ............................. 360/96.5, 96.6

(56) References Cited

U.S. PATENT DOCUMENTS

| 5,249,088 | A | * | 9/1993 | Matsuda et al. | 360/96.5 |
| 5,390,057 | A | * | 2/1995 | Nishimura et al. | 360/96.5 |
| 5,452,154 | A | * | 9/1995 | Asakura et al. | 360/96.5 |
| 5,671,102 | A | * | 9/1997 | Lee | 360/96.5 |
| 5,880,903 | A | * | 3/1999 | Park | 360/96.5 |
| 6,128,157 | A | * | 10/2000 | Choi et al. | 360/96.5 |
| 2002/0024759 | A1 | * | 2/2002 | Sawai et al. | 360/96.5 |
| 2003/0035243 | A1 | * | 2/2003 | Sawai | 360/96.5 |

FOREIGN PATENT DOCUMENTS

| JP | 62-121953 | | 6/1987 |
| JP | 4-310663 | | 11/1992 |
| JP | 06044655 A | * | 2/1994 |
| JP | 63-50965 | | 3/1998 |
| JP | 2001035049 A | * | 2/2001 |

* cited by examiner

*Primary Examiner*—Tianjie Chen
(74) *Attorney, Agent, or Firm*—Rosenthal & Osha L.L.P.

(57) ABSTRACT

Guide plates 3a and 3b are formed integrally with a chassis 2 by bending a steel plate substantially into a U shape. Swinging levers 8 are disposed inside the guide plates 3a and 3b, and pivotal attachment shafts 7 provided on the outside surfaces of the swinging levers 8 are inserted in pivotal attachment holes 37 formed through the guide plates 3a and 3b. A coupling shaft 36 is disposed between the swinging levers 8 so as to be concentric with the pivotal attachment shafts 7, and the ends 36a of the coupling shaft 36 bent substantially in an L shape are engaged with concave portions 34a formed on the inside surfaces of the swinging levers 8, thereby integrally coupling the swinging levers 8 through the coupling shaft 36. Disengagement preventing parts 35 engaging with the ends 36a of the coupling shaft 36 engaged with the concave portions 34a are integrally formed on the swinging levers 8.

4 Claims, 12 Drawing Sheets

MAGNETIC TAPE APPARATUS WITH L SHAPED COUPLING SHAFT

BACKGROUND OF THE INVENTION

1. Field of the Invention

The present utility model relates to a magnetic tape apparatus into and from which a tape cassette can be smoothly injected and ejected.

2. Related Arts

Conventional magnetic tape apparatus technologies include one described in the Unexamined Japanese Patent Application Publication No. Sho62-121953. An example thereof will be described with reference to FIG. 11 through FIG. 13. In this example, a pair of right and left guide plates 3a and 3b are disposed in a standing condition so as to be parallel to each other on a chassis 2 in a housing 1, and a plurality of guide rods 5 provided on both side surfaces of a tape cassette moving table 4 disposed between the guide plates 3a and 3b are movably inserted in a plurality of substantially L-shaped guide holes 6 formed through the guide plates 3a and 3b, so that the moving table 4 is formed so as to be movable in forward and backward directions a and b between a cassette injection position A and a cassette placement position B. Swinging levers 8 pivotally attached to the guide plates 3a and 3b through pivotal attachment shafts 7 so as to be rotatable in forward and backward directions c and d are engaged with the front guide rods 5. A worm gear 11 rotated by a drive source (not shown) is engaged with a worm gear 10 formed on a central part of the periphery of a rotating cam 9 disposed on the reverse surface of the chassis 2 so as to be rotatable. A bevel gear 12 formed on an upper part of the periphery of the rotating cam 9 and a gear 13 formed at the base end of the swinging lever 8 are coupled by a gear mechanism 14 with a clutch so as to interlock with each other. Reference numeral 15 represents a top plate disposed so as to hang between the guide plates 3a and 3b.

Figure 13:
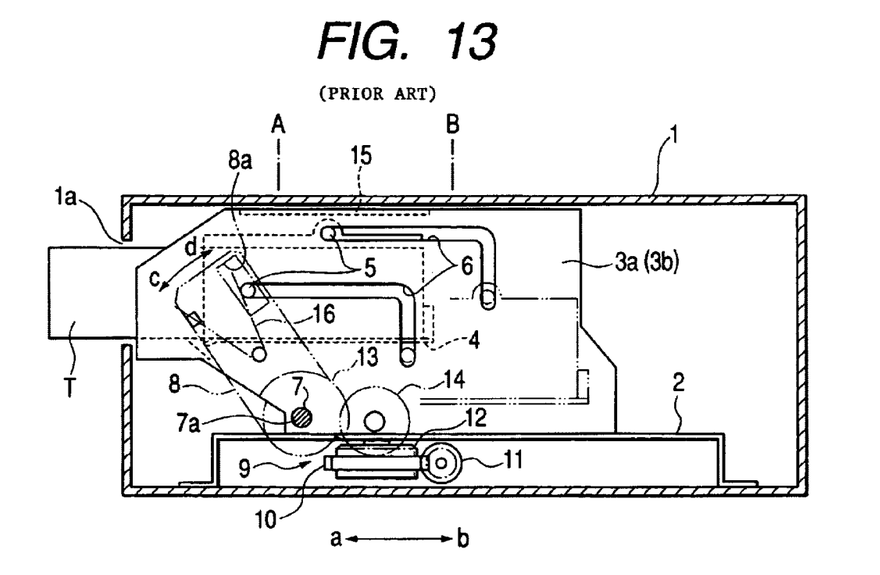
FIG. 13 is a partially cutaway side view of the conventional example.

As shown in FIG. 13, a concave groove 8a formed at the top end of each swinging lever 8 is engaged with a guide rod 5, an end of a presser bar spring 16 latched to the swinging lever 8 is engaged with the guide rod 5, and by the pressure of the presser bar spring 16, the moving table 4 is prevented from unexpectedly floating up from the cassette placement position B through the guide rod 5 (see the virtual line in FIG. 13).

Figure 11:
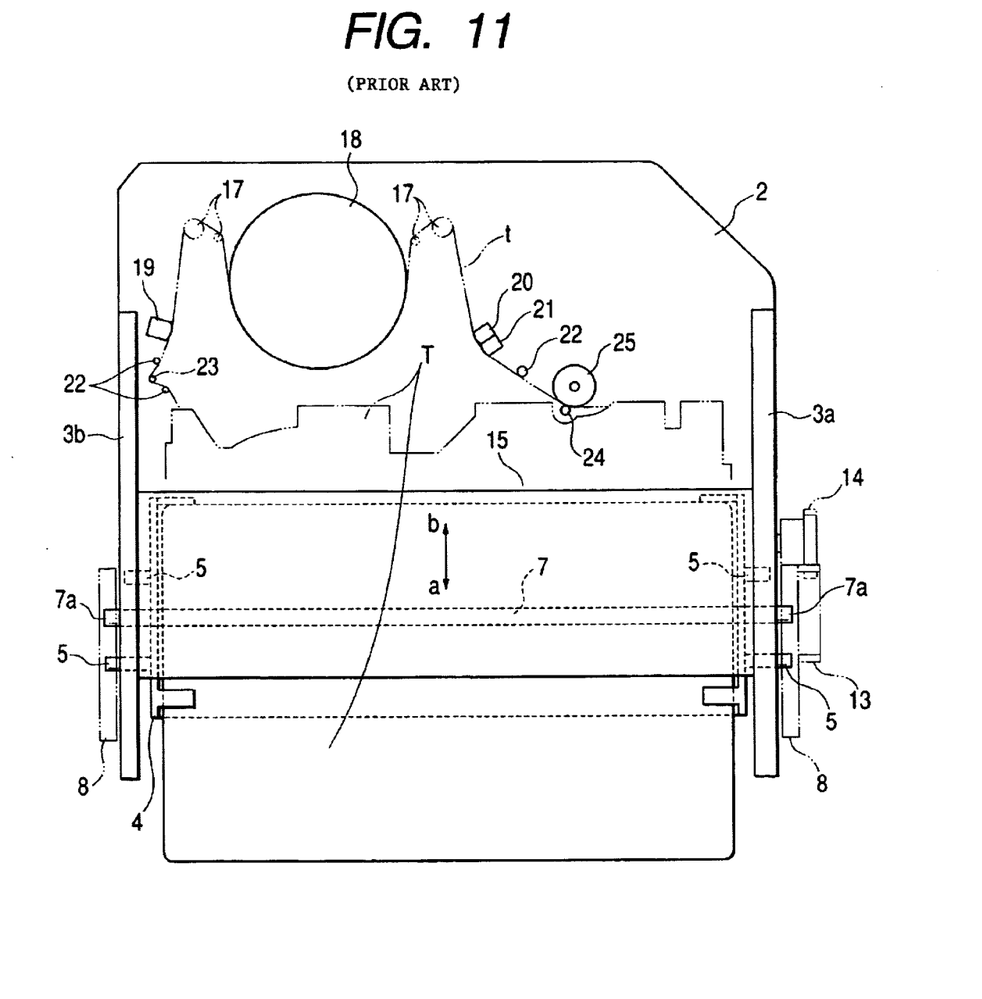
FIG. 11 is a schematic plan view showing the conventional example.
Figure 12:
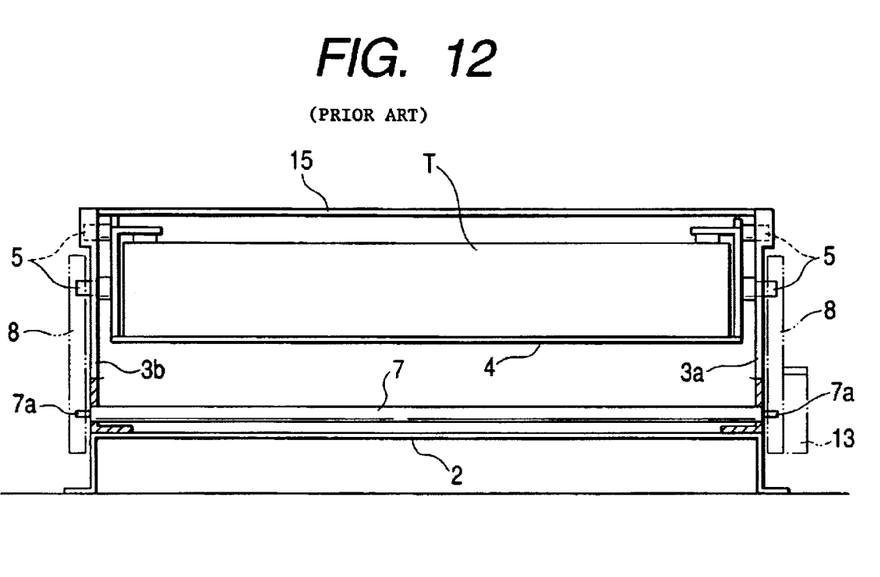
FIG. 12 is a partially cutaway front view of the conventional example.

In FIG. 11, reference numeral 17 represents movable tape guide posts for drawing magnetic tape t out of a tape cassette T and winding the tape t around a head cylinder 18, reference numeral 19 represents a full-width erase head, reference numeral 20 represents a sound erase head, reference numeral 21 represents a sound and control head, reference numeral 22 represents fixed tape guide posts, reference numeral 23 represents a back tension post, reference numeral 24 represents a capstan, and reference numeral 25 represents a pinch roller.

In the above-described structure, when the tape cassette T is injected into a tape cassette injection slot 1a of the housing 1 with the moving table 4 being on standby in the cassette injection position A as shown by the solid line in FIG. 13, since the clutch of the gear mechanism 14 is deactivated, the moving table 4 is slightly pushed in the backward direction b by the tape cassette T being injected onto the moving table 4, the clutch of the gear mechanism 14 is activated by the drive source through the worm gear 11, the worm gear 10 and the rotating cam 9 based on a detection signal from a detector (not shown) detecting that the moving table 4 is pushed, and the rotating cam 9 and the swinging levers 8 are integrally coupled so as to interlock with each other through the gear mechanism 14. Thereafter, the swinging levers 8 are rotated in the backward direction d by the drive source, so that the moving table 4 is horizontally moved in the backward direction b along the guide holes 6 and is then vertically moved down to be set in the cassette placement position B (see the virtual line in FIG. 13). Then, the magnetic tape t is drawn out of the tape cassette T (see the virtual line in FIG. 11), and an operation such as reproduction is performed.

By pressing an eject button (not shown), the swinging levers 8 are rotated in the forward direction c by the drive source through the gear mechanism 14 and the like based on the eject signal, so that the moving table 4 in the cassette placement position B is vertically moved up along the guide holes 6 and is then horizontally moved in the forward direction a to the cassette injection position A. Then, the tape cassette T is ejected (see the solid line in FIG. 13).

Figure 14:
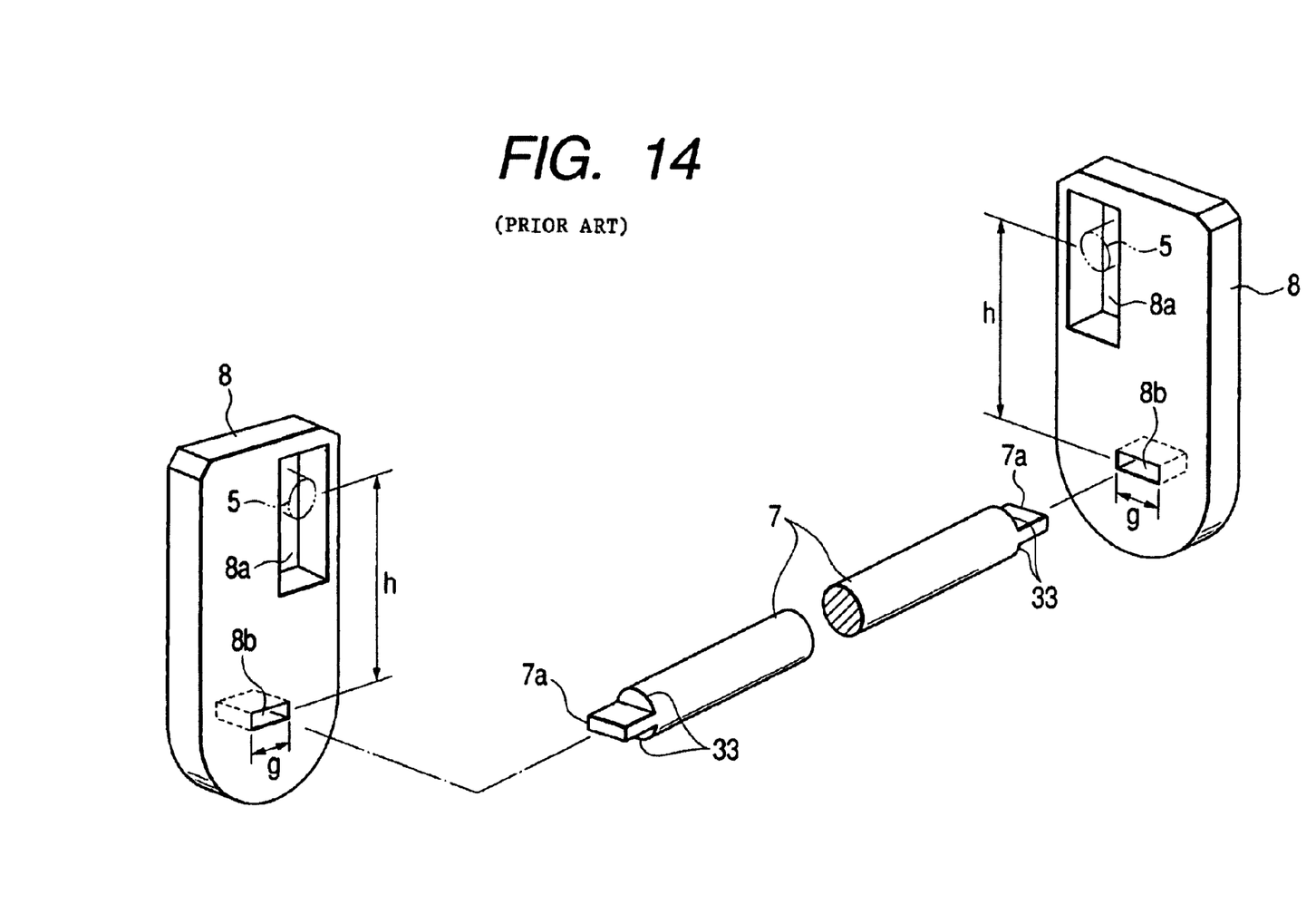
FIG. 14 is an exploded perspective view showing the condition of coupling between the coupling shaft and the swinging levers in the conventional example.

Showing the condition of coupling between the swinging levers 8 and the pivotal attachment shaft 7, as shown in FIG. 14, by forming a pair of upper and lower concave step portions 33 at each end of the pivotal attachment shaft 7 by cutting, protrusions 7a the cross sections of which have a substantially flat rectangular shape are formed between the concave step portions 33, and engagement holes 8b having a flat rectangular shape and formed at the base ends of the swinging levers 8 so as to pass therethrough are engaged with the protrusions 7a.

[Problems to be Solved]

In the above-described structure, since the distance h from the position of coupling between the pivotal attachment shaft 7 and the swinging levers 8 to the guide rods 5 engaging with the concave grooves 8a is long, when a gap is formed between the protrusions 7a and the engagement holes 8b engaged with each other, the engagement backlash due to the gap is transmitted to the guide rods 5 being enlarged by a relational expression h/g (here, g is the width of the engagement holes 8b), so that the swinging levers 8 cannot be rotated in the forward and backward directions c and d in synchronicity with each other. Consequently, while moving in the forward and backward directions a and b, the moving table 4 exhibits a behavior such as inclining to come into contact with the guide plates 3a and 3b, so that it is difficult to move the moving table 4 in the forward and backward directions a and b as predetermined. As a result, the tape cassette T cannot be smoothly injected or ejected.

Moreover, since the swinging levers 8 are disposed outside the guide plates 3a and 3b, when the swinging levers 8 are coupled to the pivotal attachment shaft 7, it is necessary to insert the pivotal attachment shaft 7 into the through holes of the guide plates 3a and 3b (see FIG. 12) and then reliably engage the engagement holes 8b of the swinging levers 8 with the protrusions 7a of the pivotal attachment shaft 7 so that there is no backlash. This is cumbersome and requires time.

Further, since it is necessary to precisely cut the ends of the pivotal attachment shaft 7 to form the protrusions 7a, the cost of production is high.

SUMMARY OF THE INVENTION

In view of the above-mentioned problem, an object of the present utility model is to provide a magnetic tape apparatus into and from which a tape cassette can be smoothly injected and ejected.

[Means for Solving the Problems]

To solve the above-mentioned object, according to the utility model as set forth in Aspect 1, in a magnetic tape apparatus in which a tape cassette moving table is disposed between guide plates on a chassis so as to be movable in forward and backward directions, a pair of right and left swinging levers pivotally attached to the guide plates are engaged with guide rods provided on the moving plate, and by rotating the swinging levers in forward and backward directions, the moving table is moved through the guide rods in the forward and the backward directions between a cassette injection position and a cassette placement position set between the guide plates; the swinging levers are disposed inside the guide plates, pivotal attachment shafts provided on outside surfaces of the swinging levers are inserted in pivotal attachment holes formed through the guide plates, a coupling shaft is disposed between the swinging levers so as to be concentric with the pivotal attachment shafts and the ends of the coupling shaft bent substantially in an L shape are engaged with concave portions formed on inside surfaces of the swinging levers to thereby integrally couple the swinging levers through the coupling shaft, and disengagement preventing parts engaging with the ends of the coupling shaft engaged with the concave portions are integrally formed on the swinging levers.

According to this structure, since the ends of the coupling shaft bent substantially in an L shape are deeply engaged with the concave portions of the swinging levers substantially in an L shape, an engagement backlash is not readily caused between the substantially L-shaped ends and the concave portions, and even if an engagement backlash is caused, since the distance from the substantially L-shaped ends to the guide rods engaging with the swinging levers is short, the engagement backlash is not significantly enlarged. Consequently, the swinging levers can be reliably rotated in the forward and backward directions in synchronicity with each other through the coupling shaft, so that the moving table can be moved in the forward and backward directions as predetermined. As a result, the tape cassette can be smoothly injected and ejected.

In producing the coupling shaft, since it is necessary only to bend both ends of a bar substantially into an L shape and it is unnecessary to precisely cut the ends like the conventional method (see FIG. 14), the cost of production is low.

When the coupling shaft is coupled to the swinging levers, since it is necessary only that the pivotal attachment shafts provided on the outside surfaces of the swinging levers be inserted into the pivotal attachment holes formed through the guide plates and then, the substantially L-shaped ends of the coupling shaft be engaged with the concave portions of the swinging levers, the coupling can be performed quickly and easily.

Figure 1:
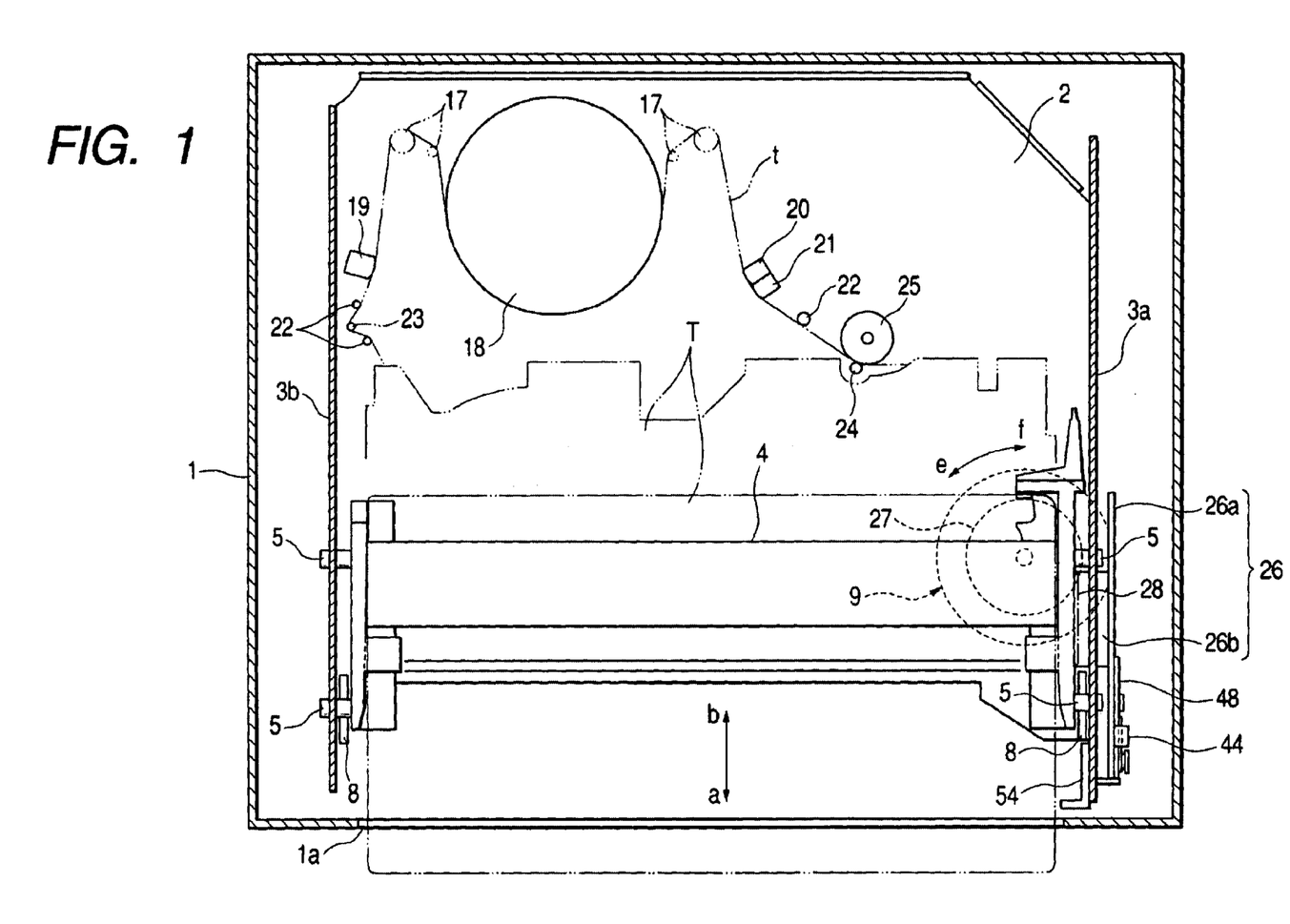
FIG. 1 is a schematic plan view of the magnetic tape apparatus according to the embodiment of the utility model.
Figure 2:
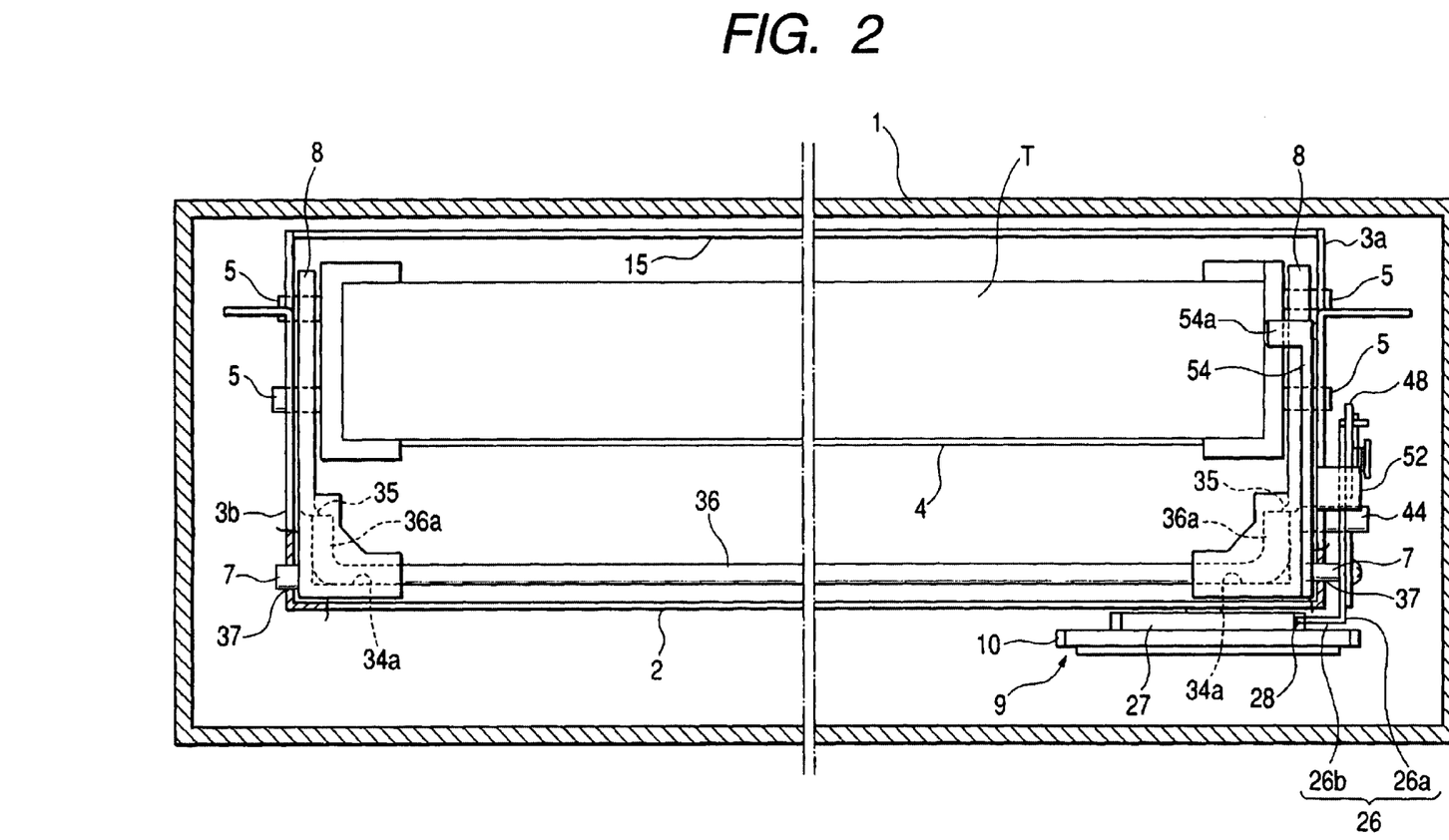
FIG. 2 is an enlarged partially cutaway front view of the magnetic tape apparatus.

What is important here is that the swinging levers are disposed not outside the guide plates like in the conventional apparatus (see FIG. 12) but inside the guide plates (see FIG. 2). With this, the swinging levers can be precisely placed in position by use of the guide plates, and the ends of the coupling shaft can be easily engaged with the concave portions of the swinging levers. When the ends are engaged with the concave portions, the guide plates are never obstructions, so that the coupling can be performed quickly and easily.

Further, only by engaging the ends of the coupling shaft with the concave portions of the swinging levers, the ends can be prevented from disengaging from the concave portions by the disengagement preventing parts, so that the coupling can be performed quickly and reliably.

According to the utility model as set forth in Aspect 2, in the utility model as set forth in Aspect 1, the guide plates are formed integrally with the chassis by bending a steel plate substantially into a U shape.

According to this structure, only by bending a steel plate substantially into a U shape, can the chassis and the guide plates be integrally and inexpensively mass-produced, so that low cost of production is realized.

According to the utility model as set forth in Aspect 3, in a magnetic tape apparatus in which a tape cassette moving table is disposed between guide plates on a chassis so as to be movable in forward and backward directions, a pair of right and left swinging levers pivotally attached to the guide plates through pivotal attachment shafts are engaged with guide rods provided on the moving plate, and by rotating the swinging levers in forward and backward directions, the moving table is moved through the guide rods in the forward and the backward directions between a cassette injection position and a cassette placement position set between the guide plates; a coupling shaft is disposed between the swinging levers so as to be concentric with the pivotal attachment shafts and the ends of the coupling shaft are engaged with concave portions formed on inside surfaces of the swinging levers to thereby integrally couple the swinging levers through the coupling shaft.

According to this structure, only by engaging the ends of the coupling shaft with the concave portions of the swinging levers with the swinging levers pivotally attached to the guide plates through the pivotal attachment shafts, the swinging levers can be easily and quickly coupled through the coupling shaft.

According to the utility model as set forth in Aspect 4, in the utility model as set forth in Aspect 3, the ends of the coupling shaft are bent substantially in an L shape and the substantially L-shaped ends are engaged with the concave portions of the swinging levers.

According to this structure, since the ends of the coupling shaft bent substantially in an L shape are deeply engaged with the concave portions of the swinging levers substantially in an L shape, an engagement backlash is not readily caused between the substantially L-shaped ends and the concave portions, and even if an engagement backlash is caused, since the distance from the substantially L-shaped ends to the guide rods engaging with the swinging levers is short, the engagement backlash is not significantly enlarged. Consequently, the swinging levers can be reliably rotated in the forward and backward directions in synchronicity with each other through the coupling shaft, so that the tape cassette can be smoothly injected and ejected.

According to the utility model as set forth in Aspect 5, in the utility model as set forth in Aspect 4, disengagement preventing parts engaging with the ends of the coupling shaft engaged with the concave portions are integrally formed on the swinging levers.

According to this structure, since the disengagement preventing parts are engaged with the ends of the coupling shaft engaged with the concave portions of the swinging levers, there is no possibility that the ends of the coupling shaft are unexpectedly disengaged from the concave portions, so that the swinging levers can be reliably coupled through the coupling shaft.

DETAILED DESCRIPTION OF THE PREFERRED EMBODIMENTS

[Embodiments]

FIG. 1 through FIG. 6 show a magnetic tape apparatus according to an embodiment of the present utility model. By bending a steel plate substantially into a U shape, a pair of right and left guide plates 3a and 3b are formed integrally with a chassis 2. Swinging levers 8 and a rotating cam 9 for moving a moving table 4 disposed between the guide plates 3a and 3b in forward and backward directions a and b are coupled through a slide plate 26 so as to interlock with each other. The swinging levers 8 are integrally coupled to each other by a coupling shaft 36. The elements and portions other than these and the same as those shown in FIG. 11 through FIG. 14 are designated by the same reference numerals, and descriptions thereof are omitted.

The slide plate 26 comprises, as shown in FIG. 2 through FIG. 6, a slide plate main part 26a disposed so as to be slidable along the right guide plate 3a, and a bent part 26b bent substantially in an L shape from the lower end of the slide plate main part 26a and extending toward the rotating cam 9. A rack 28 engaging with a pinion 27 of the rotating cam 9 is formed on the bent part 26b. The slide plate 26 can be mass-produced inexpensively with a steel plate.

Figure 3:
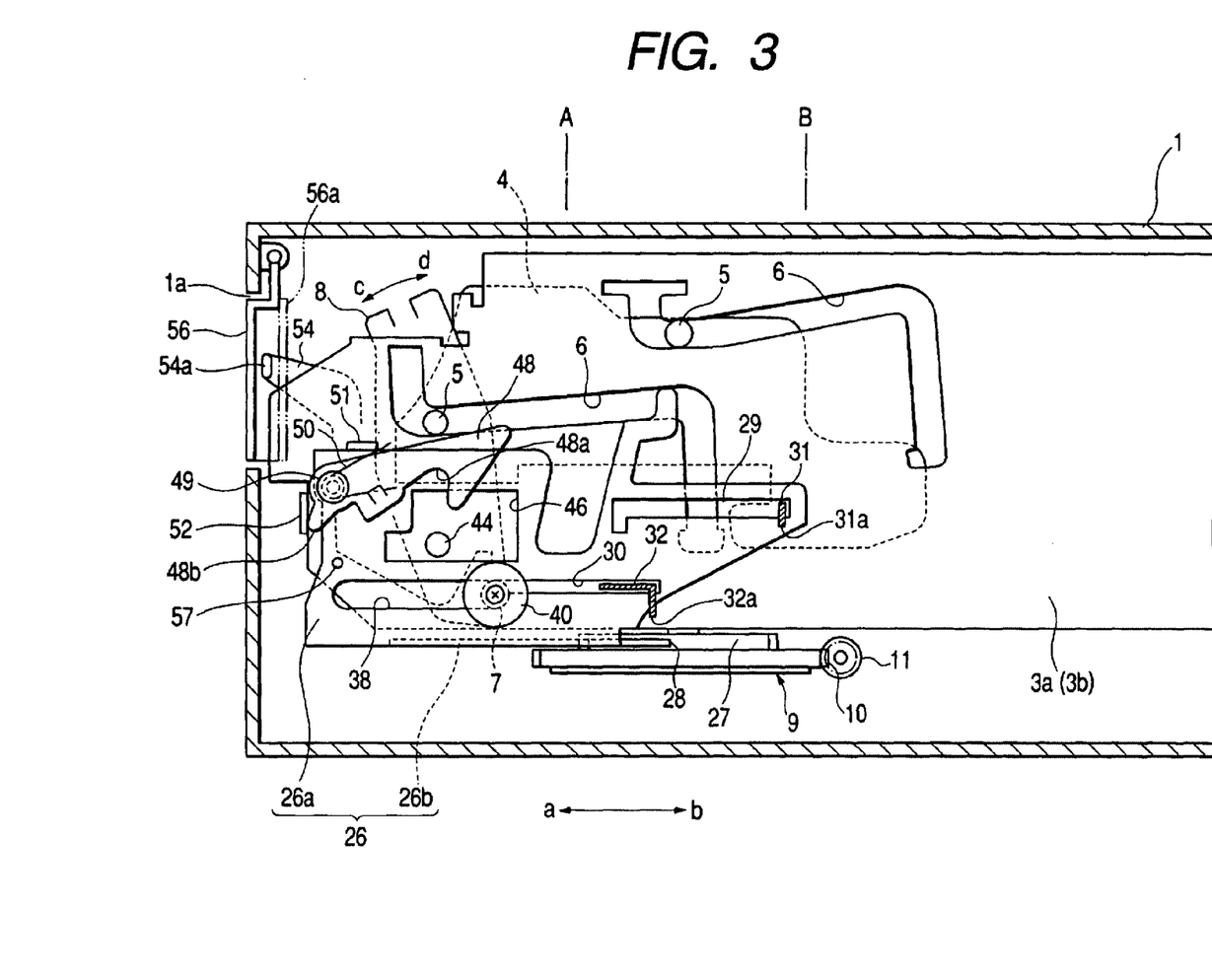
FIG. 3 is an enlarged partially cutaway side view of the magnetic tape apparatus in a condition where the moving table is moved in the forward direction.

As shown in FIG. 3, a pair of upper and lower slits 29 and 30 are formed in the slide plate main part 26a in the forward and backward directions a and b, supports 31 and 32 provided on the right guide plate 3a in a protruding condition are inserted in the slits 29 and 30, and disengagement preventing parts 31a and 32a formed by bending ends of the supports 31 and 32 abut on the outside surface of the slide plate main part 26a. With this structure, the slide plate 26 can be supported so as not to move vertically and so as not to be separated from the right guide plate 3a.

Figure 6:
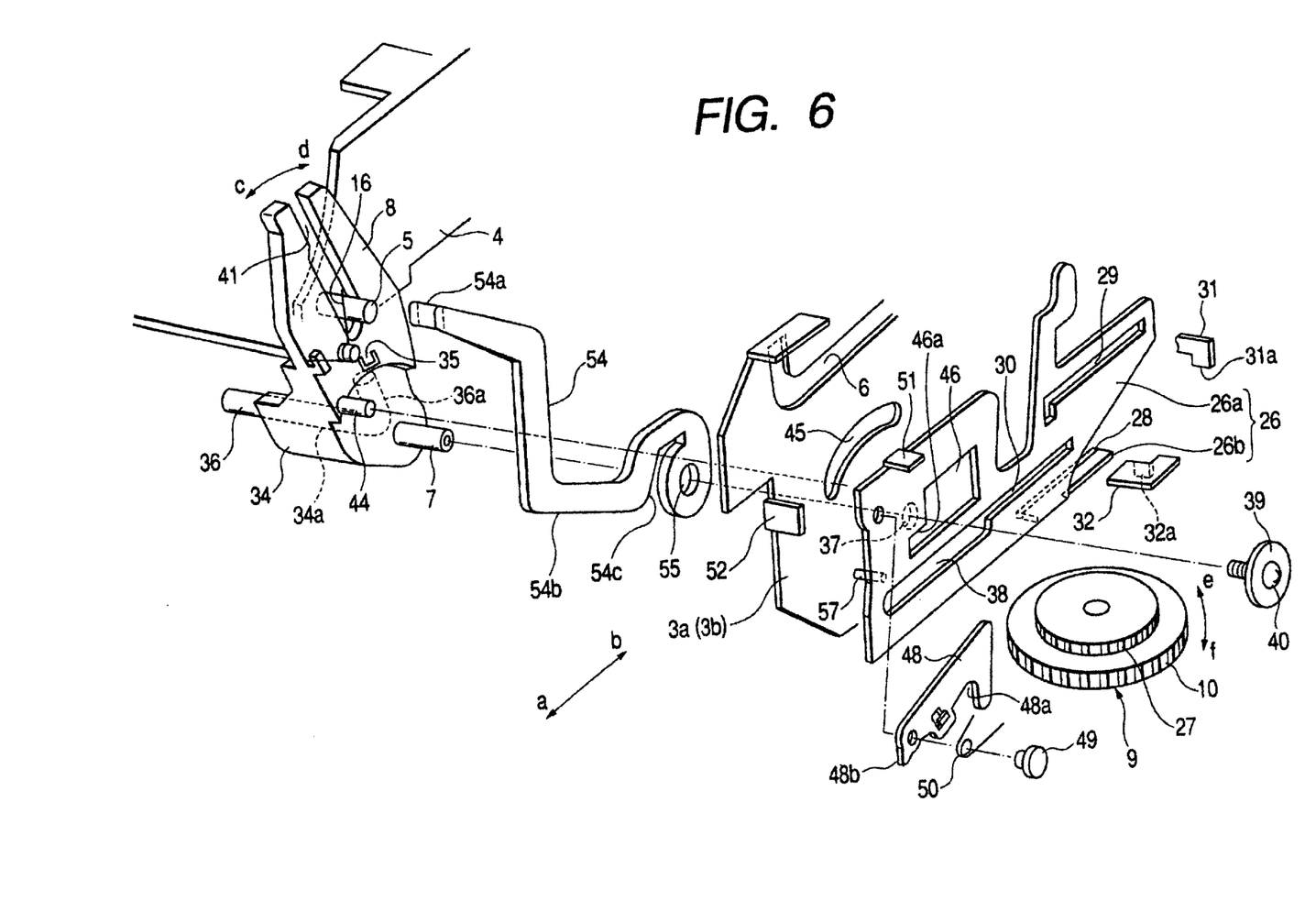
FIG. 6 is an exploded perspective view of the main part of the magnetic tape apparatus.
Figure 7:
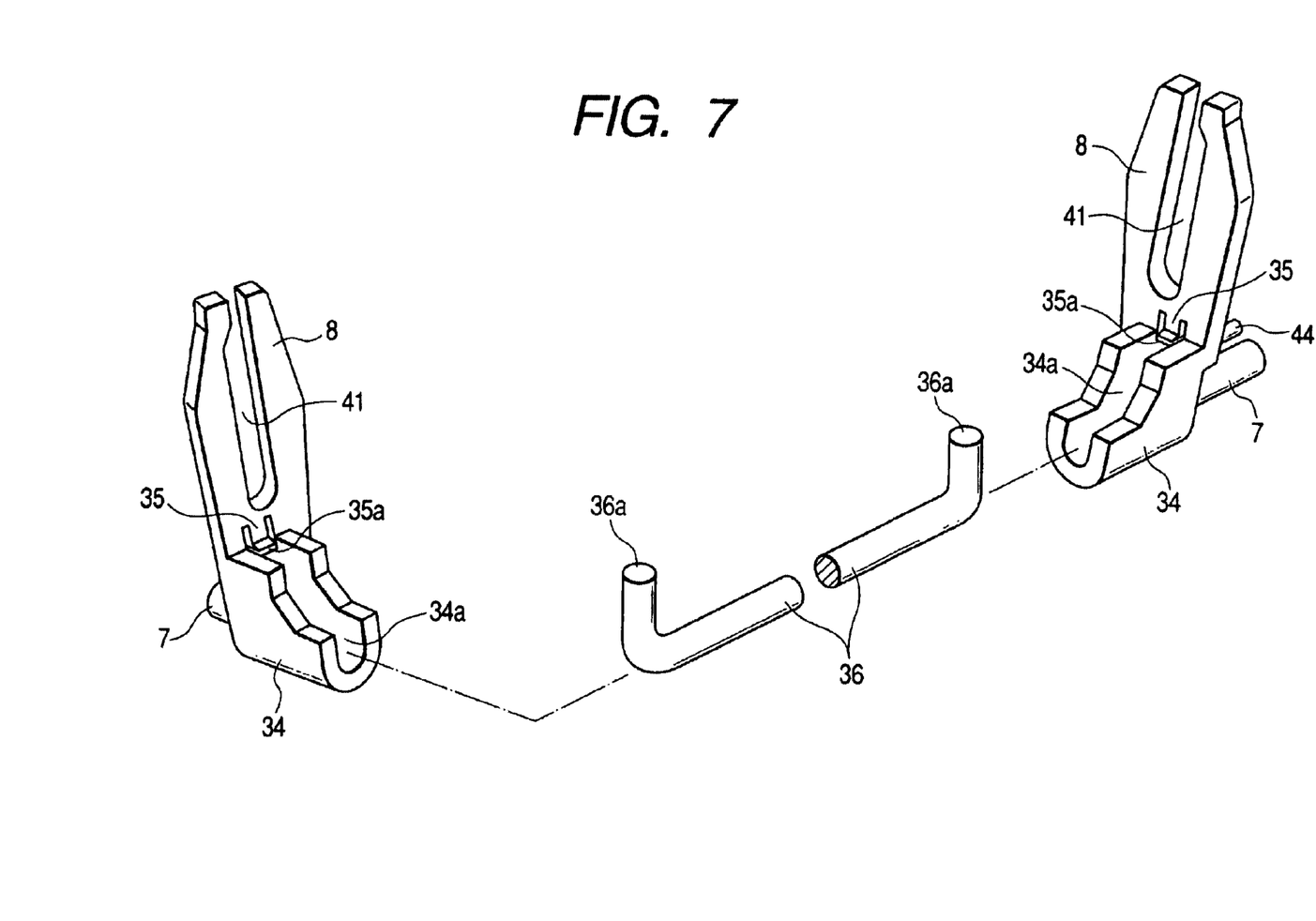
FIG. 7 is an exploded perspective view showing the condition of coupling between the coupling shaft and the swinging levers in the magnetic tape apparatus.
Figure 8:
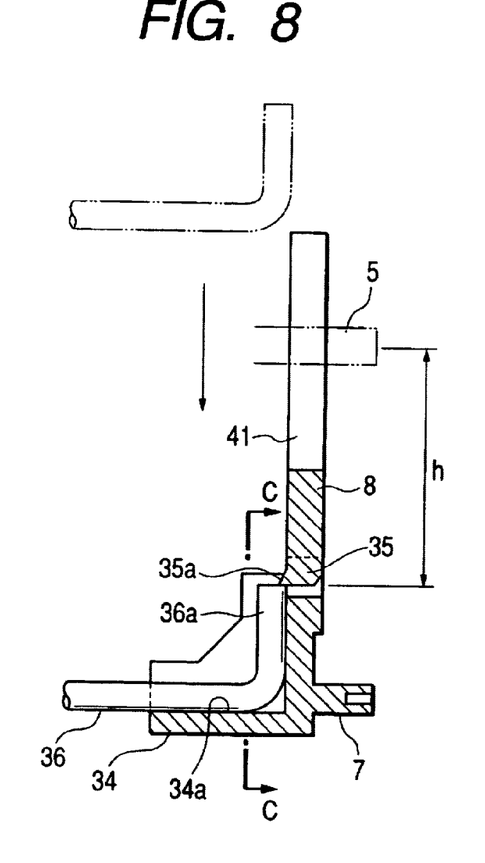
FIG. 8 is a lateral cross-sectional view showing the condition of coupling.
Figure 9:
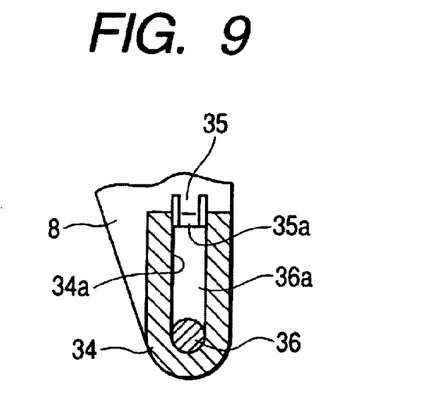
FIG. 9 is a view taken on the arrow C—C.

With respect to the swinging levers 8, as shown in FIG. 2, FIG. 6 and FIG. 7, a pair of right and left swinging levers 8 are disposed inside the guide plates 3a and 3b. A pivotal attachment shaft 7 provided on the outside surface of each swinging lever 8 is rotatably inserted in a pivotal attachment hole 37 of each of the guide plates 3a and 3b. A substantially L-shaped concave portion 34a is formed in a protrusion 34 provided on the inside surface of each swinging lever 8. The coupling shaft 36 is disposed between the swinging levers 8 so as to be concentric with the pivotal attachment shafts 7, and ends 36a of the coupling shaft 36 bent substantially in an L shape are engaged with the concave portions 34a of the swinging levers 8, so that the swinging levers 8 are integrally coupled to each other through the coupling shaft 36. As shown in FIG. 8 and FIG. 9, a disengagement preventing part 35 is formed by forming a substantially U-shaped slit in a central part of each swinging lever 8. An end 35a of the detachment preventing part 35 protrudes sideward from the inside surface of each swinging lever 8 and is engaged with an end surface of the end 36a engaging with the concave portion 34a.

Figure 10A:
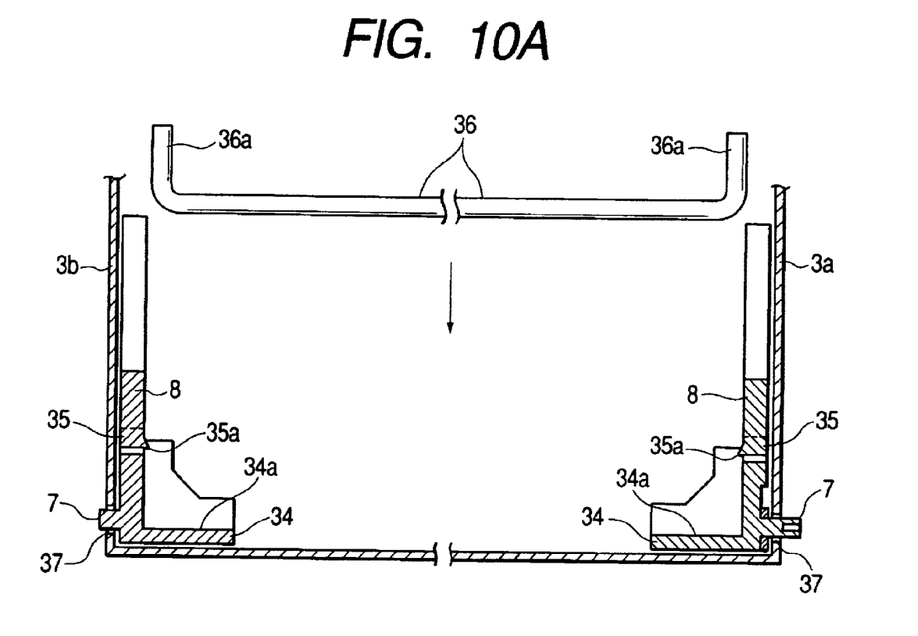
FIGS. 10A and 10B are lateral cross-sectional views showing the procedure of coupling the coupling shaft to the swinging levers.
Figure 10B:
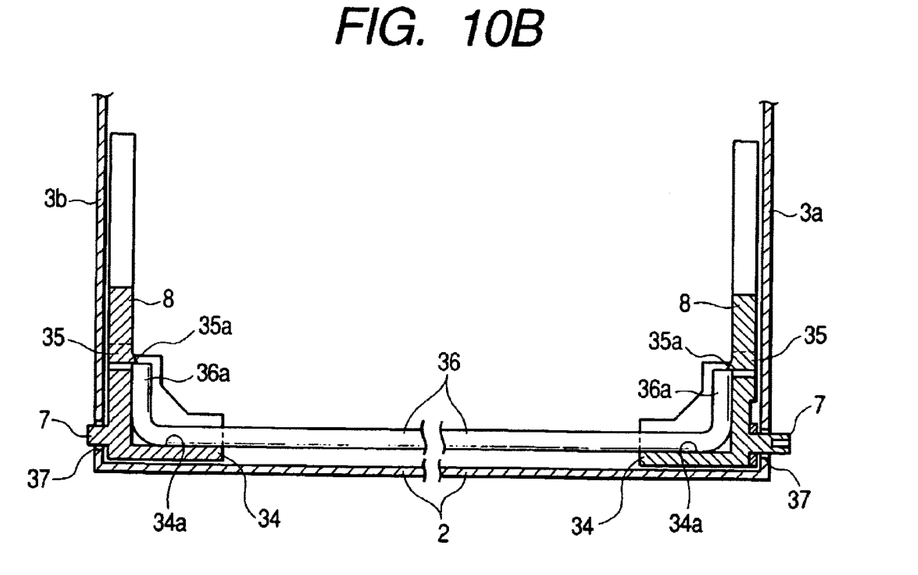

In the above-described structure, when the coupling shaft 36 is coupled to the swinging levers 8, it is necessary only that the pivotal attachment shafts 7 of the swinging levers 8 be inserted into the pivotal attachment holes 37 of the guide plates 3a and 3b as shown in FIG. 10A and then, the substantially L-shaped ends 36a of the coupling shaft 36 be engaged with the concave portions 34a of the swinging levers 8 by pushing the ends 35a of the disengagement preventing parts 35 as shown in FIG. 10B by moving down the coupling shaft 36 from above the interval of the swinging levers 8.

In this case, since the swinging levers 8 are disposed not outside the guide plates 3a and 3b like in the conventional apparatus (see FIG. 12) but inside the guide plates 3a and 3b (see FIG. 2), the swinging levers 8 can be precisely placed in position by use of the guide plates 3a and 3b, and the ends 36a of the coupling shaft 36 can be easily engaged with the concave portions 34a of the swinging levers 8. When the ends 36a are engaged with the concave portions 34a, the guide plates 3a and 3b are never obstructions, so that the coupling can be performed quickly and easily.

Moreover, since the ends 36a of the coupling shaft 36 bent substantially in an L shape are deeply engaged substantially in an L-shape with the concave portions 34a of the swinging levers 8 as shown in FIG. 8 and FIG. 9, an engagement backlash is not readily caused between the substantially L-shaped ends 36a and the concave portions 34a, and even if an engagement backlash is caused, since the distance h from the substantially L-shaped ends 36a to the guide rods 5 engaging with the swinging levers 8 is short, the engagement backlash is not significantly enlarged. Consequently, the swinging levers 8 can be reliably rotated in the forward and backward directions c and d in synchronicity with each other through the coupling shaft 36, so that the moving table 4 can be moved in the forward and backward directions a and b as predetermined. As a result, the tape cassette T can be smoothly injected and ejected.

Further, in producing the coupling shaft 36, since it is necessary only to bend both ends of a bar substantially into an L shape and it is unnecessary to precisely cut the ends 36a like the conventional method (see FIG. 14), the cost of production is low.

Further, since the disengagement preventing parts 35 are engaged with the ends 36a of the coupling shaft 36 engaged with the concave portions 34a of the swinging levers 8, there is no possibility that the ends 36a of the coupling shaft 36 are unexpectedly disengaged from the concave portions 34a, so that the swinging levers 8 can be reliably coupled through the coupling shaft 36.

As shown in FIG. 3 and FIG. 6, the pivotal attachment shaft 7 of the right swinging lever 8 is inserted in an elongated hole 38 formed in the slide plate main part 26a in the forward and backward directions a and b, a disengagement preventing washer 40 fixedly attached to the end surface of the pivotal attachment shaft 7 with a screw 39 is made to abut on the outside surface of the slide plate main part 26a, a concave groove 41 formed from the top end of each swinging lever 8 toward the base end of the same is engaged with the front guide rod 5 provided on each side surface of the moving table 4, and an end of the presser bar spring 16 is engaged with the guide rod 5.

As shown in FIG. 3 and FIG. 6, an engagement pin 44 provided on the right swinging lever 8 is inserted, through a through hole 45 of the right guide plate 3a, in an engagement hole 46 formed through the slide plate main part 26a, and as shown in FIG. 3, from a condition where the moving table 4 is on standby in the cassette injection position A, the slide plate 26 is slid backward so as to push the engagement pin 44 in a peripheral part of the engagement hole 46, thereby rotating the swinging lever 8 in the backward direction d. Consequently, the moving table 4 is moved in the backward direction b toward the cassette placement position B. According to this, since only the engagement hole 46 is engaged with the pin 44, the structure is simple and the cost of production is low.

As shown in FIG. 3 and FIG. 6, the base end of a lock lever 48 on the top end of which an arc-shaped lock groove 48a capable of being engaged with the engagement pin 44 is formed is rotatably attached to an upper front part of the slide plate main part 26a through a pivotal attachment shaft 49. An end of an engagement spring 50 wound around the pivotal attachment shaft 49 is engaged with the lock lever 48 and the other end of the engagement spring 50 is engaged with an engagement part 51 bent from the upper end of the slide plate 26, so that the lock lever 48 is pushed toward the engagement pin 44. A protrusion 48b is provided at the base end of the lock lever 48 so as to be opposed to a lock release part 52 bent from the front end of the right guide plate 3a.

Figure 4:
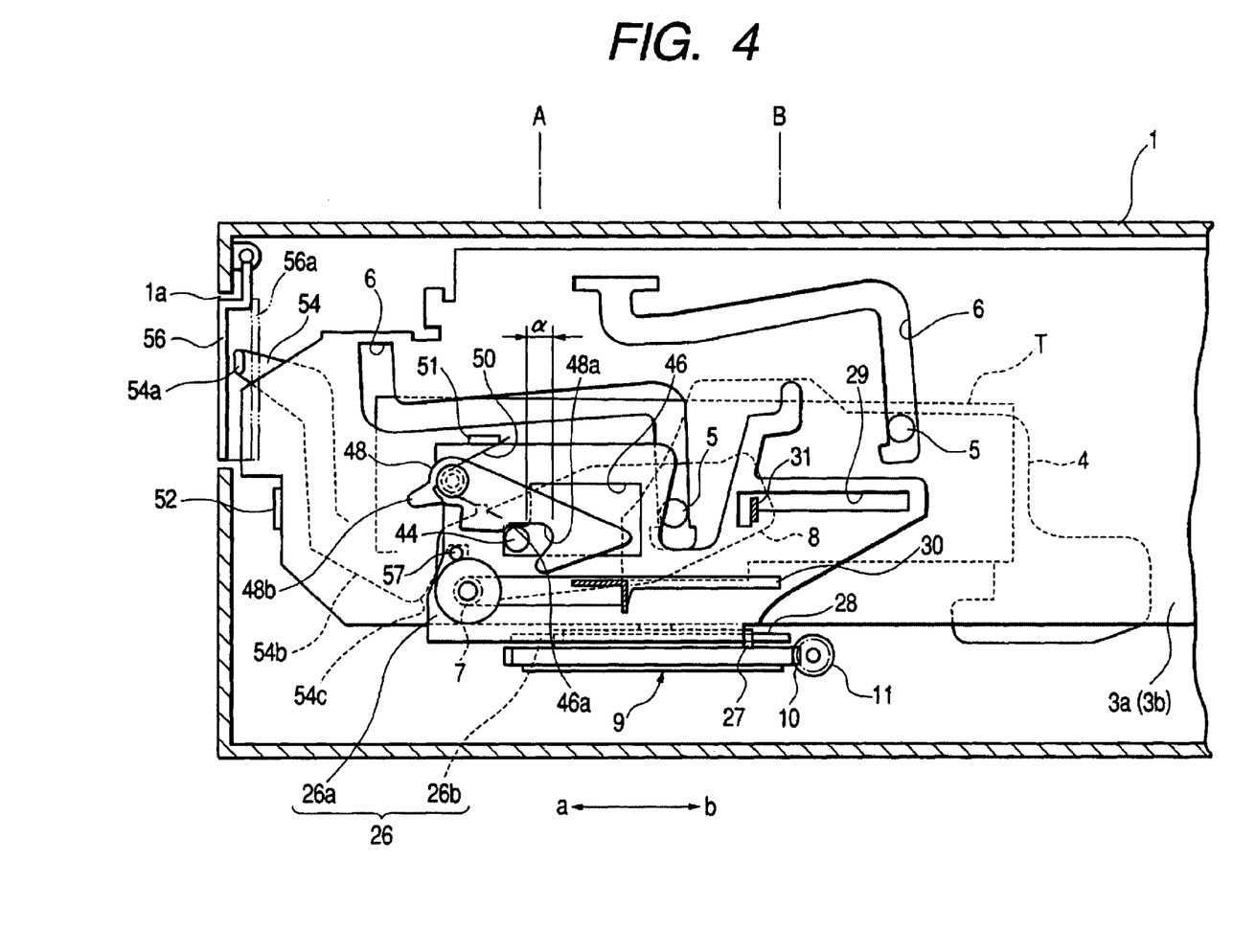
FIG. 4 is an enlarged partially cutaway side view of the magnetic tape apparatus in a condition where the moving table is moved in the backward direction.
Figure 5:
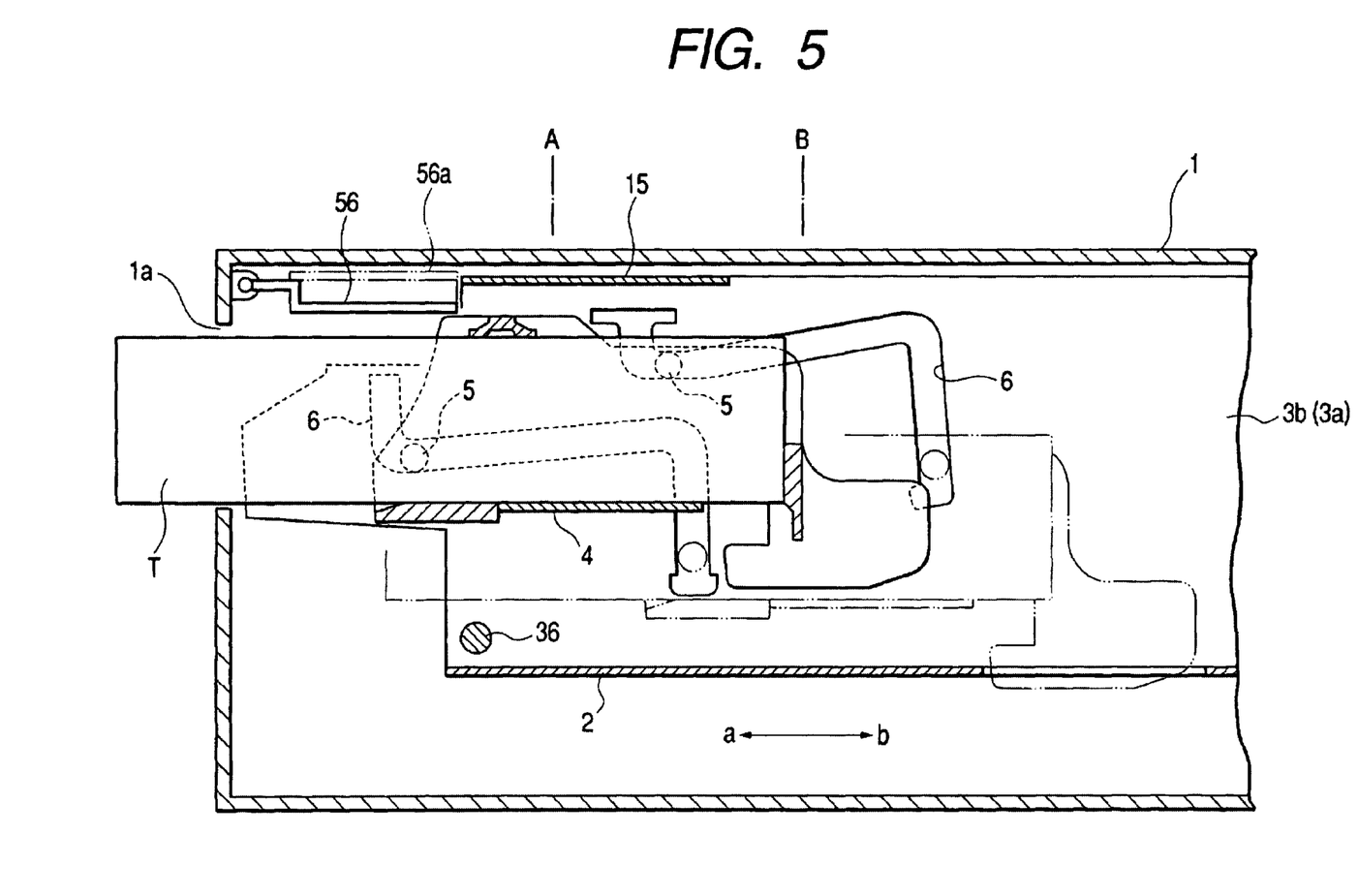
FIG. 5 is an enlarged longitudinal cross-sectional view of the magnetic tape apparatus when the tape cassette is injected.

In the above-described structure, as shown in FIG. 4, by sliding the slide plate 26 forward based on the eject signal with the moving table 4 being set in the cassette placement position B, the lock lever 48 is slid in the same direction. Before the lock lever 48 is slid, a gap α with a width substantially the same as the diameter of the engagement pin 44 is formed between the lock groove 48a and the engagement pin 44 so that there is a slight time lag before the lock groove 48a is engaged with the engagement pin 44. Therefore, an opening and closing door 56 of the tape cassette injection slot 1a can be opened before the moving table 4 is moved in the forward direction a because of the time lag, and then, by engaging the lock groove 48a with the engagement pin 44 as the slide plate 26 is slid forward, the swinging levers 8 are rotated in the forward direction c to move the moving table 4 in the forward direction a, so that the tape cassette T set on the moving table 4 can be ejected without striking the opening and closing door 56.

Since the lock lever 48 is separated from the engagement pin 44 against the engagement spring 50 for unlocking by engaging the protrusion 48b of the lock lever 48 with the lock release part 52 when the moving table 4 is moved in the forward direction a to the cassette injection position A (see FIG. 3), when the tape cassette T is injected onto the moving table 4 being on standby in the cassette injection position A at the time of injection (see FIG. 5), the moving table 4 is allowed to move in the backward direction b and the movement in the backward direction b can be reliably detected by a detector. Although the function of the lock lever 48 corresponds to that of the conventional clutch, the structure is simple and the cost of production is low compared to the clutch.

In FIG. 4 and FIG. 6, reference numeral 46a represents a floating preventing portion formed in a peripheral part of the engagement hole 46. When the moving table 4 is set in the cassette placement position B, the floating preventing portion 46a abuts on or is close to an upper peripheral part of the engagement pin 44 to thereby prevent the moving table 4 from floating up. Reference numeral 54 represents a door opening lever. A through hole 55 at the base end is rotatably fitted on the pivotal attachment shaft 7, and an end 54a of the door opening lever 54 is engaged with a side peripheral part 56a of the opening and closing door 56. By rotating the door opening lever 54 by sliding the slide plate 26 backward and forward and engaging a release pin 57 provided on the slide plate 26 with inclined surfaces 54b and 54c of the door opening lever 54, the opening and closing door 56 can be opened (see FIG. 5).

Explaining the working of the above-described structure, as shown in FIG. 3, at the time of injection, the opening and closing door 56 is pushed up by the tape cassette T and the tape cassette T is injected onto the moving table 4 being on standby in the cassette injection position A (see FIG. 5) to thereby push the moving table 4 in the backward direction b. Based on a detection signal from a detector detecting that the moving table 4 is pushed, switching to automatic retraction is made.

In the automatic retraction, the rotating cam 9 is rotated in a forward direction e by a drive source through the worm gear 11 and the worm gear 10, and the slide plate 26 is slid backward through the pinion 27 and the rack 28 of the rotating cam 9. By pushing the engagement pin 44 in the peripheral part of the engagement hole 46 by this, the swinging levers 8 are rotated in the backward direction d, so that the moving table 4 is horizontally moved in the backward direction b along the guide holes 6 and is then vertically moved down to be set in the cassette placement position B (see FIG. 4). Then, the magnetic tape t is drawn out of the tape cassette T (see FIG. 1) and an operation such as reproduction is performed.

By the backward slide of the slide plate 26, the protrusion 48b of the lock lever 48 is separated from the lock release part 52, and the lock lever 48 is rotated downward by the engagement spring 50 to abut on the engagement pin 44. At this time, the gap α with a width substantially the same as the diameter of the engagement pin 44 is formed between the engagement pin 44 and the lock groove 48a (see FIG. 4).

The floating preventing portion 46a formed in the peripheral part of the engagement hole 46 abuts on or is close to the upper peripheral part of the engagement pin 44 (see FIG. 4). By this, the moving table 4 set in the cassette placement position B is prevented from floating up, so that the magnetic tape t is smoothly loaded from the tape cassette T set on the moving table 4 and a clear image can be reproduced.

Then, by pressing an eject button (not shown), the rotating cam 9 is rotated in a reverse direction f by the drive source based on the eject signal, thereby sliding the slide plate 26 forward through the pinion 27 and the rack 28 of the rotating cam 9. By this, the release pin 57 is pressed against the rear inclined surface 54c of the door opening lever 54, so that the door opening lever 54 is rotated upward to open the opening and closing door 56. Then, the lock groove 48a of the lock lever 48 is engaged with the engagement pin 44 and the swinging levers 8 are rotated in the forward direction c, so that the moving table 4 is vertically moved up along the guide holes 6 and is then horizontally moved in the forward direction a to the cassette injection position A. Then, the tape cassette T is ejected (see FIG. 5).

[Effects of the Utility Model]

According to the utility model as set forth in Aspect 1, since the ends of the coupling shaft bent substantially in an L shape are deeply engaged with the concave portions of the swinging levers substantially in an L shape, an engagement backlash is not readily caused between the substantially L-shaped ends and the concave portions, and even if an engagement backlash is caused, since the distance from the substantially L-shaped ends to the guide rods engaging with the swinging levers is short, the engagement backlash is not significantly enlarged. Consequently, the swinging levers can be reliably rotated in the forward and backward directions in synchronicity with each other through the coupling shaft, so that the moving table can be moved in the forward and backward directions as predetermined. As a result, the tape cassette can be smoothly injected and ejected.

In producing the coupling shaft, since it is necessary only to bend both ends of a bar substantially into an L shape and it is unnecessary to precisely cut the ends like the conventional method (see FIG. 14), the cost of production is low.

When the coupling shaft is coupled to the swinging levers, since it is necessary only that the pivotal attachment shafts provided on the outside surfaces of the swinging levers be inserted into the pivotal attachment holes formed through the guide plates and then, the substantially L-shaped ends of the coupling shaft be engaged with the concave portions of the swinging levers, the coupling can be performed quickly and easily.

What is important here is that the swinging levers are disposed not outside the guide plates like in the conventional apparatus (see FIG. 12) but inside the guide plates (see FIG. 2). With this, the swinging levers can be precisely placed in position by use of the guide plates, and the ends of the coupling shaft can be easily engaged with the concave portions of the swinging levers. When the ends are engaged with the concave portions, the guide plates are never obstructions, so that the coupling can be performed quickly and easily.

Further, only by engaging the ends of the coupling shaft with the concave portions of the swinging levers, the ends can be prevented from disengaging from the concave portions by the disengagement preventing parts, so that the coupling can be performed quickly and reliably.

According to the utility model as set forth in Aspect 2, only by bending a steel plate substantially into a U shape, can the chassis and the guide plates be integrally and inexpensively mass-produced, so that the cost of production is low.

According to the utility model as set forth in Aspect 3, only by engaging the ends of the coupling shaft with the concave portions of the swinging levers with the swinging levers pivotally attached to the guide plates through the pivotal attachment shafts, can the swinging levers be easily and quickly coupled through the coupling shaft.

According to the utility model as set forth in Aspect 4, since the ends of the coupling shaft bent substantially in an L shape are deeply engaged with the concave portions of the swinging levers substantially in an L shape, an engagement backlash is not readily caused between the substantially L-shaped ends and the concave portions, and even if an engagement backlash is caused, since the distance from the substantially L-shaped ends to the guide rods engaging with the swinging levers is short, the engagement backlash is not significantly enlarged. Consequently, the swinging levers can be reliably rotated in the forward and backward directions in synchronicity with each other through the coupling shaft, so that the moving table can be moved in the forward and backward directions as predetermined. As a result, the tape cassette can be smoothly injected and ejected.

According to the utility model as set forth in Aspect 5, since the disengagement preventing parts are engaged with the ends of the coupling shaft engaged with the concave portions of the swinging levers, there is no possibility that the ends of the coupling shaft are unexpectedly disengaged from the concave portions, so that the swinging levers can be reliably coupled through the coupling shaft.

What is claimed is:

1. A magnetic tape apparatus comprising:
    a tape cassette moving table disposed between guide plates on a chassis so as to be movable in forward and backward directions;
    a pair of right and left swinging levers pivotally attached to said guide plates are engaged with guide rods provided on said moving plate, wherein by rotating said swinging levers in forward and backward directions, said moving table is moved through said guide rods in the forward and the backward directions between a cassette injection position and a cassette placement position set between said guide plates;
    said swinging levers are disposed inside said guide plates;
    pivotal attachment shafts provided on outside surfaces of said swinging levers are inserted in pivotal attachment holes formed through said guide plates;
    a coupling shaft is disposed between said swinging levers so as to be concentric with said pivotal attachment shafts;
    the ends of said coupling shaft bent substantially in an L shape are engaged with concave portions formed on inside surfaces of said swinging levers to integrally couple said swinging levers through said coupling shaft; and
    disengagement preventing parts engaging with the ends of said coupling shaft engaged with the concave portions are integrally formed on said swinging levers.

2. The magnetic tape apparatus as in claim 1, wherein said guide plates are formed integrally with said chassis by bending a steel plate substantially into a U shape.

3. A magnetic tape apparatus comprising:
    a tape cassette moving table disposed between guide plates on a chassis so as to be movable in forward and backward directions;
    a pair of right and left swinging levers pivotally attached to said guide plates through pivotal attachment shafts engaged with guide rods provided on said moving table; wherein by rotating said swinging levers in forward and backward directions, said moving table moved through said guide rods in the forward and the backward directions between a cassette injection position and a cassette placement position set between said guide plates; and
    a coupling shaft is disposed between said swinging levers so as to be concentric with said pivotal attachment shafts and ends of said coupling shaft are engaged with concave portions formed on inside surfaces of said swinging levers to integrally couple said swinging levers through said coupling shaft;
    wherein said ends of the coupling shaft are bent substantially in an L shape, and the substantially L-shaped ends are engaged with the concave portions of said swinging levers.

4. A magnetic tape apparatus comprising:

a tape cassette moving table disposed between guide plates on a chassis so as to be movable in forward and backward directions;

a pair of right and left swinging levers pivotally attached to said guide plates through pivotal attachment shafts engaged with guide rods provided on said moving table; wherein by rotating said swinging levers in forward and backward directions, said moving table moved through said guide rods in the forward and the backward directions between a cassette injection position and a cassette placement position set between said guide plates; and a coupling shaft is disposed between said swinging levers so as to be concentric with said pivotal attachment shafts and ends of said coupling shaft are engaged with concave portions formed on inside surfaces of said swinging levers to integrally couple said swinging levers through said coupling shaft;

wherein said ends of the coupling shaft are bent substantially in an L shape, and the substantially L-shaped ends are engaged with the concave portions of said swinging levers;

wherein disengagement preventing parts engaging with the ends of said coupling shaft engaged with the concave portions are integrally formed on said swinging levers.

* * * * *

UNITED STATES PATENT AND TRADEMARK OFFICE
CERTIFICATE OF CORRECTION

PATENT NO. : 6,667,847 B2
DATED : December 23, 2003
INVENTOR(S) : Kunio Sawai It is certified that error appears in the above-identified patent and that said Letters Patent is hereby corrected as shown below:

Title page,
Item [54], Title, please delete "WITH L SHAPED COUPLING SHAFT".

Signed and Sealed this

Thirteenth Day of April, 2004

JON W. DUDAS
*Acting Director of the United States Patent and Trademark Office*